Patented Dec. 29, 1953

2,664,404

UNITED STATES PATENT OFFICE 2,664,404

REGENERATION OF SELECTIVE HYDROGENATION CATALYST

Leo J. Blatz and Richard C. Brandon, Elizabeth, N. J., assignors to Standard Oil Development Company, a corporation of Delaware No Drawing. Application August 18, 1949, Serial No. 111,074

3 Claims. (Cl. 252—419)

This application is a continuation in part of application Serial No. 677,094, filed June 15, 1946, now abandoned.

This invention relates to a method of reactivating a catalytic material resistant to ordinary poisons yet highly selective in hydrogenation.

Catalysts employed in hydrogenation processes have been classified as sulfur-sensitive and sulfur-insensitive. The sulfur-sensitive hydrogenation catalysts are highly selective and intensely active at low temperatures but lose activity rapidly when contacted with sulfur-containing feed stocks. The sulfur-insensitive catalysts, represented by chromium or molybdenum oxides and sulfides, are used at relatively high temperatures for hydrogenation. These relatively high temperatures result in cracking, which leads to excessive formation of low boiling by-products and lowered yields of the desired saturated products. The nickel and noble metal catalysts have been recognized in the art as belonging to the class of sulfur-sensitive hydrogenation catalysts which catalyze hydrogenation at temperatures below 400° F., but in the form that these active catalysts have been used they have been too readily poisoned by traces of sulfur, organic peroxides, and unsaturated polymers usually present in petroleum products subjected to hydrogenation. These sulfur-sensitive catalysts have a life too short for commercial use and are not readily regenerated.

An object of the present invention is to provide a reactivated hydrogenation catalyst which is relatively insensitive or resistant to sulfur poisoning, yet sufficiently active so that it is effective for selectively hydrogenating petroleum products at below cracking temperatures.

A more specific object of this invention is to provide a satisfactory method of regenerating the active sulfur-resistant catalytic material which selectively promotes hydrogenation of petroleum products at below cracking temperatures.

Another object of the invention is to regenerate the catalyst by treatment with an oxygen containing gas under conditions such that contaminating deposits are oxidized and driven off while the catalyst remains unoxidized.

The catalytic material now determined to possess the desired selective hydrogenation characteristics with resistance to ordinary poisoning comprises a minor proportion (0.1 to 10% by weight) of a noble metal chosen from the group consisting of platinum and palladium deposited on an ultramicroscopic-pored base, typified by hydrous oxides, such as silica and alumina.

The platinized or palladiumized hydrous oxide base may be prepared by mulling of the base with the colloidal noble metal followed by pelleting or by mixing the base with a saturated solution of an acid or salt compound of the metal (e. g., in the case of platinum, chloroplatinic acid or ammonium chloroplatinate), followed by wet extrusion of the mix. The extruded pellets are dried and then reduced with hydrogen or other reducing agent at elevated temperatures. The base in powdered form may be mixed with colloidal particles of the metal and pilled in a dry form. The pilled or pelleted catalytic material may be used as such in a fixed bed type of operation or may be granulated to smaller size for use with a moving or fluid type catalyst technique in obtaining selective hydrogenation of petroleum products.

The sulfur-resistant catalytic materials containing platinum or palladium in the manner described have been satisfactorily employed under specifically controlled conditions for selectively hydrogenating organic peroxide contaminants and diolefins in unsaturated hydrocarbon stocks. They have also been used for selectively hydrogenating aromatic compounds. They have even been found very effective for reduction of sulfur content in cracked naphthas. In these low temperature, low pressure hydrogenation processes, product recovery was substantially 100% in all runs and the catalytic material was used for periods ranging up to about 100 hours. Also, under proper conditions, they have been used for selectively dehydrogenating hydro-aromatic compounds.

The following examples, not intended to be restrictive, are cited to show the regenerability of the sulfur-resistant catalytic materials:

EXAMPLE 1

A feed stock of tri-isobutylene polymer at a space velocity of 1 volume liquid per volume catalytic material per hour was hydrogenated by being passed in vapor phase with excess hydrogen (1500 cu. ft. per 42 gal. bbl. of polymer oil) over catalytic pellets containing 2% of colloidal platinum deposited on alumina, this catalytic material having been deactivated by deposits from previous operations. Pertinent test data in the hydrogenation of the isobutylene trimer are tabulated as follows:

[Trimer plus 1,500 C. F./B. H₂ at 1.0 v./v./hr.]

| Run number | Feed | A | B |
|---|---|---|---|
| Temperature, °F | | 300 | 400 |
| Pressure, p. s. i. g | | Atm. | Atm. |
| Liquid recovery, volume percent | 100 | 100 | 100 |
| Bromine number of recovered condensate, cg./g | 91.5 | 90.8 | 92.6 |

It is evident from the test data that the used catalytic material was substantially inactive. Following this operation, the deactivated catalytic material was subjected to regeneration by passing air diluted with inert gas (nitrogen or flue gas) over the catalytic material. The per cent of oxygen in the regenerating gas was held at about 2–6% during the major portion of the regeneration period and during the final stages, was increased to about 20%. The temperature of the catalytic material initially was brought up to 700° F., then rose rapidly. By controlling the ratio of inert gas to air used in the manner indicated during the regeneration, the temperature was prevented from rising above 1100° F. Tests showed that carbon dioxide was present in the regeneration gas as evidence that combustion of carbonaceous deposits was occurring. No further carbon dioxide formation indicated that reactivation was completed. The platinum remained unoxidized during this regeneration and as shown by tests, therefore, did not require reduction prior to reuse.

Following the regeneration and without treatment of the catalyst with hydrogen or other reducing agent, some of the same trimer feed stock was treated with the regenerated catalytic material under the same conditions as set forth above to obtain the following data:

Trimer plus 1,500 C. F./B. H₂ at 1.0 v./v./hr.

| Run number | Feed | C | D |
|---|---|---|---|
| Temperature, °F | | 300 | 400 |
| Pressure, p. s. i. g | | Atm. | Atm. |
| | | 101 | 101 |
| Liquid recovery, volume percent | | 100 | |
| Bromine number of recovered condensate, cg./g | 91.5 | 13.4 | 0.0 |

It will be noted that the regeneration markedly revivified the catalyst.

EXAMPLE 2

A sample of high-sulfur catalytically cracked naphtha was treated with the sulfur-resistant catalytic material as follows:

| | |
|---|---|
| Catalyst | 2% platinum on alumina. |
| Temperature | 600° F. |
| Pressure | 100 lbs. per sq. in. |
| Naphtha feed rate | 1.0 v./v./hr. |
| H₂ feed rate | 1,500 C. F./B. |

| Hours on stream | Feed | 0–32 | 32–64 | 72–80 | 80–88 |
|---|---|---|---|---|---|
| Condensate inspections: | | | | | |
| Bromine number, cg./g | 25.9 | 2.6 | 2.0 | 1.3 | 10.3 |
| Sulfur, weight percent | 0.143 | 0.018 | 0.069 | 0.115 | 0.121 |

It is to be noted that by the 88 hours operation, the catalytic material had become degraded in effectiveness for removing sulfur and reducing unsaturation. Controlled regeneration of the catalytic material was carried out in the manner previously described, and in further operation on the same feed stock with the regenerated catalytic material under identical conditions, the following results were obtained:

| Hours on stream [a] | Feed | 0–16 | 16–32 |
|---|---|---|---|
| Condensate inspections: | | | |
| Bromine number, cg./g | 25.9 | 0.5 | 0.7 |
| Sulfur, weight percent | 0.143 | 0.001 | 0.002 |

[a] After regeneration.

Here, regeneration improved the desulfurization activity of the catalyst.

As illustrated in the foregoing examples, the sulfur-resistant catalytic materials are satisfactorily regenerated by burning the carbonaceous deposits with a gas mixture of air or oxygen and a sufficient proportion of inert gas to control the regeneration temperature. The regeneration did not cause any deterioration of the catalytic material such as would generally be experienced in oxidizing, sintering, or fusing of finely-divided metal catalysts. The regenerated catalyst did not require reduction with hydrogen or the like prior to use in the productive phase, since the combustion of the contaminants during the regeneration did not cause oxidation of the noble metal, as determined by examination of the regenerated catalyst. Satisfactory regeneration is very important in the commercial use of the precious metal catalysts.

Unlike intensely active hydrogenation catalysts that have been used in the past on pure hydrocarbons, the catalytic materials of interest in the present invention do not require a reduction step following their reactivation by oxidation of contaminating deposits and are not adversely affected by the presence of oxygen or oxidizing gases. Furthermore, any sulfiding or depositing of sulfur-containing compounds which may occur during the use of these catalytic materials does not prevent their ready reactivation by oxidation of such sulfur compounds and their removal from the catalyst under conditions indicated.

These readily regenerable sulfur-resistant catalytic materials have many important uses. They can be used with impure hydrogen, which is readily available and inexpensive in selective hydrogenation and purification treatments of various impure organic substances. The impure hydrogen may be a manufactured fuel gas containing sulfur, oxygen, and carbon monoxide, which have very adverse effects on the usual active and sulfur-sensitive catalysts.

The examples given are for the purpose of illustration and it will be understood that numerous modifications thereof, not specifically mentioned, come within the scope of the invention.

What is claimed is:

1. The method of reactivating compact pieces of catalytic material containing 0.1 to 10% by weight of a colloidal platinum group metal selected from the class consisting of platinum and palladium supported by a hydrous oxide carrier having ultramicroscopic pores after said catalytic material has become deactivated by carbonaceous deposits, which consists of heating the catalytic material to a temperature of approximately 700° F., contacting the catalytic material with a stream of inert gas mixed with oxygen in controlled amounts so that the platinum group metal is not oxidized and the temperature of the catalytic material does not substantially exceed 1100° F. during combustion of its deactivating deposits, the catalyst is not oxidized, sintered nor fused, and the catalyst is rendered suitable for reuse in the productive phase without necessitating a reduction step.

2. The method of reactivating a pelleted catalytic material containing 0.1 to 10% by weight of finely-divided platinum on alumina used for hydrogenating a petroleum product containing sulfur, which comprises burning deactivating deposits from the catalytic material by contact with an oxygen-containing gas at temperatures ranging from 700° F. to 1100° F., controlling the burning by maintaining the oxygen content of the oxygen-containing gas at from about 2–6% during the major part of the regeneration so that the platinum does not become oxidized by combustion of said deposits during the said combustion, thereafter increasing the oxygen content of the regeneration gas under such conditions that the platinum remains at a temperature of not over 1100° F., whereby the catalyst is rendered suitable for reuse in the productive phase without necessitating a reduction step.

3. The method of reactivating contact pieces of catalytic material containing 0.1 to 10% by weight of platinum supported on alumina which catalyst has been deactivated during the dehydrogenation of hydroaromatics by the accumulation of deactivating deposits thereon which comprises burning said deactivating deposits from the catalytic material by contact with an oxygen-containing gas and controlling the oxygen concentration of the said oxygen-containing gas during the reactivation so that the temperature of the catalytic material is maintained between 700° and 1100° F. during combustion of its deactivating deposits by utilizing air diluted with inert gas as the oxygen-containing gas during the combustion of a major portion of the said deposits thereafter increasing the oxygen concentration of the oxygen-containing gas under such conditions that the platinum remains at a temperature of not over 1100° F. whereby the catalyst is rendered suitable for reuse in the dehydrogenation reaction.

LEO J. BLATZ.
RICHARD C. BRANDON.

References Cited in the file of this patent

UNITED STATES PATENTS

| Number | Name | Date |
|---|---|---|
| 2,207,868 | Martin | July 16, 1940 |
| 2,272,711 | Hull | Feb. 10, 1942 |
| 2,461,838 | Neuhart | Feb. 15, 1949 |
| 2,470,092 | Corson et al. | May 17, 1949 |
| 2,478,916 | Haensel | Aug. 16, 1949 |

OTHER REFERENCES

Mellor: "Comp. Treatis on Inorg. and Theor. Chem.," vol. 16 (1937), p. 47.